United States Patent
Hoffman

(10) Patent No.: US 9,612,637 B1
(45) Date of Patent: Apr. 4, 2017

(54) SYSTEM AND METHOD FOR CONTROLLING PARALLEL LEGS IN A SWITCHED MODE POWER SUPPLY

(71) Applicant: Rockwell Automation Technologies, Inc., Mayfield Heights, OH (US)

(72) Inventor: Jonathan D. Hoffman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/952,003

(22) Filed: Nov. 25, 2015

(51) Int. Cl.
*H02M 3/156* (2006.01)
*G06F 1/26* (2006.01)

(52) U.S. Cl.
CPC ...................... *G06F 1/26* (2013.01)

(58) Field of Classification Search
CPC .... H02M 3/156–3/158; H02M 3/1588; H02M 2001/0009; H02M 2001/0032; Y02B 70/1466; G06F 1/26
USPC ....................... 323/21.01–21.18; 307/87, 127
See application file for complete search history.

(56) References Cited

U.S. PATENT DOCUMENTS

| | | | |
|---|---|---|---|
| 7,253,540 B1 | 8/2007 | Thalheim et al. | |
| 2009/0109711 A1* | 4/2009 | Hsu | H02M 3/33592 363/21.14 |
| 2009/0284989 A1* | 11/2009 | Sato | H02M 3/33592 363/19 |
| 2012/0033465 A1* | 2/2012 | Lee | H02M 3/33507 363/53 |
| 2013/0301310 A1* | 11/2013 | Wang | H02M 3/33523 363/21.12 |
| 2013/0301311 A1* | 11/2013 | Wang | H02M 3/33515 363/21.13 |
| 2014/0204625 A1* | 7/2014 | Liu | H02M 3/33592 363/21.13 |

* cited by examiner

*Primary Examiner* — Yemane Mehari
(74) *Attorney, Agent, or Firm* — Boyle Fredrickson, SC

(57) ABSTRACT

An improved system and method for controlling multiple, paralleled switching devices in a switching power supply is disclosed. The switching device includes parallel legs between voltage rails on the input where each leg is connected to a common output. Each leg may have a single switching device or pairs of switching devices. According to one embodiment of the invention, the switching device(s) for each leg is enabled during one carrier period and the leg having switching devices enabled is alternated during subsequent carrier periods. According to another embodiment of the invention, the switching device(s) for each leg are enabled during each carrier period; however, the switching device(s) for one leg are enabled within the carrier period prior to the switching device(s) for the other legs and the first leg to be enabled is alternated during successive carrier periods.

20 Claims, 7 Drawing Sheets

SYSTEM AND METHOD FOR CONTROLLING PARALLEL LEGS IN A SWITCHED MODE POWER SUPPLY

BACKGROUND OF THE INVENTION

The subject matter disclosed herein relates generally to a switching power supply and, more specifically, to a system and method for controlling paralleled switching devices in a power supply.

As is known to those skilled in the art, switching power supplies utilize a power semiconductor device, such as a thyristor, silicon-controlled rectifier (SCR), or one of several types of transistors, such as insulated-gate bipolar transistors (IGBTs) or metal-oxide-semiconductor field-effect transistors (MOSFETs) to regulate power flow between an input and an output of the power supply. The power semiconductor devices may be arranged in numerous configurations such as boost, buck, half bridge, or full bridge arrangements to convert and/or regulate the voltage provided at the input to a desired voltage at the output of the power supply.

Typically a processor generates gating signals at a periodic frequency, also referred to as the switching frequency, to control operation of the power semiconductor, or switching, devices. The gating signals cause each device to conduct or block voltage through the device at certain times during the switching period. The switching devices are often paired with a diode, reverse-connected across the switching device, and with reactive elements, such as capacitors or inductors to maintain a desired voltage level and/or a desired current flow through the power converter for short durations when the switching device is turned off. Appropriate modulation techniques can generate gating signals to increase or decrease the voltage level between the input and the output as well as convert the voltage between an alternating current (AC) voltage and a direct current (DC) voltage.

As is also known to those skilled in the art, the switching devices in a switching power supply generate power losses within the power supply. Two common losses are switching losses and conduction losses. Switching losses result from a sudden transient condition and resultant spike in voltage and/or current across the switching device when the device transitions between an "on" and an "off" state. Conduction losses result from power dropped across the device due to the amplitude of current conducted and the inherent resistive properties of the switching device. As the power ratings of the switching devices increase, the corresponding power loss in the device similarly increases. Further, as the switching frequency increases, the number of transitions increases which, in turn, increases the switching losses across the device. Due to the increased power lost in switching devices as the ratings and switching frequencies increase, the switching power supply requires increased cooling and/or heat dissipation capacity of the switching power supply. Increasing the cooling or heat dissipation capacity results in additional expense and/or size for the power supply.

Historically, it has been known to connect multiple switching devices in parallel to provide switching power supplies having an increased overall power rating, yet allowing each of the switching devices to dissipate a portion of the power losses. Ideally, switching each of the paralleled devices in unison results in the switching and conduction losses being distributed evenly among the devices. However, due to manufacturing tolerances and transmission delays within control circuits, even if the same gating signal is provided to each device, there is typically some variation in the time at which each device turns on and/or off. As a result, one of the devices bears the majority of the switching losses and is likely to fail prior to the other devices. Many techniques have been developed to synchronize switching of the paralleled devices. However, the synchronization routines have varying levels of success and add undesirable complexity to controlling the switching devices.

Thus, it would be desirable to provide an improved system and method for controlling multiple, paralleled switching devices in a switching power supply.

BRIEF DESCRIPTION OF THE INVENTION

The subject matter disclosed herein describes an improved system and method for controlling multiple, paralleled switching devices in a switching power supply. The switching device includes parallel legs between voltage rails on the input where each leg is also connected to a common output. Each leg may have a single switching device or pairs of switching devices with the connection to the common output located between the two switching devices. A carrier signal is generated at a first frequency, that is, the carrier frequency. A reference signal is generated as a function of the input voltage to provide a desired voltage potential at the output of the switching power supply. The reference signal is used to generate control signals for each of the switching devices within the switching power supply. According to one embodiment of the invention, the switching device(s) for each leg is enabled during one carrier period and the leg having switching devices enabled is alternated during subsequent carrier periods such that the switching device(s) for each leg is enabled once within a second frequency. According to another embodiment of the invention, the switching device(s) for each leg are enabled during each carrier period; however, the switching device(s) for one leg are enabled within the carrier period prior to the switching device(s) for the other legs. The leg that is enabled first is alternated during subsequent carrier periods such that each leg is enabled first once within the second frequency.

According to one embodiment of the invention, a system for controlling power flow between an input to a power converter and an output from the power converter is disclosed. The input includes a first and a second terminal and the output includes a first and a second terminal. The system includes a plurality of legs within the power converter, and each leg includes a common connection, a first switching device, and a second switching device. The first switching device is connected between the first terminal of the input and the common connection for that leg, and the second switching device is connected between the common connection for that leg and the second terminal of the input. The common connections for each leg are connected together and are connected to the first terminal of the output. The system also includes an inductor and a processor. The inductor is connected in series between the first terminal of the output and a load operable to receive the power output from the power converter. The processor is operable to generate a carrier signal, having a carrier frequency, and to generate a plurality of control signals. Each control signal corresponds to the first switching device for one of the plurality of legs and selectively establishes an electrical connection between the first terminal of the input and the common connection for that leg. A first duration is defined equal to the period of the carrier frequency, and a second duration is defined equal to a number of the plurality of legs present in the power converter multiplied by the first duration. Each of the plurality of control signals is provided to the corresponding first switching device once within the second duration.

According to another embodiment of the invention, a method for reducing losses in a power converter is disclosed. The power converter includes a first voltage rail configured to conduct a DC voltage at a first voltage potential, a second voltage rail configured to conduct a DC voltage at a second voltage potential, and a plurality of legs. Each leg is connected in parallel between the first voltage rail and the second voltage rail, and each leg includes at least one switching device. The method includes the steps of executing a modulation routine on a processor at a carrier frequency and generating a plurality of control signals with the processor. Each control signal corresponds to the at least one switching device on one of the plurality of legs, one control signal is generated during each period of the carrier frequency, the control signal for the at least one switching device for each of the plurality of legs is generated in a sequence within a second frequency, and the second frequency is equal to the carrier frequency divided by the number of legs.

According to still another embodiment of the invention, a system for controlling power flow between an input to a power converter and an output from the power converter is disclosed. The input includes a first and a second terminal and the output includes a first and a second terminal. The system includes a first voltage rail within the power converter connected to the first terminal of the input, a second voltage rail within the power converter connected to the second terminal of the input, and a plurality of legs within the power converter. Each leg is connected in parallel to the other legs between the first voltage rail and the second voltage rail, and each leg includes at least one switching device selectively enabled by a control signal. The system also includes a processor operable to generate a carrier signal at a carrier frequency for a modulation routine, generate the control signal for the at least one switching device in one of the plurality of legs during each carrier period, and generate the control signal for the at least one switching device for each of the plurality of legs in a sequence such that the at least one switching device for each of the plurality of legs receives its corresponding control signal once within a second frequency. The second frequency is equal to the carrier frequency divided by the number of legs.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 7b is a graphical representation of control signals supplied to a first portion of the switching devices as a result of the carrier signal and the reference signal of FIG. 7a;

FIG. 7c is a graphical representation of control signals supplied to a second portion of the switching devices as a result of the carrier signal and the reference signal of FIG. 7a;

FIG. 8b is a graphical representation of control signals supplied to a first portion of the switching devices as a result of the carrier signal and the reference signal of FIG. 8a;

FIG. 8c is a graphical representation of control signals supplied to a second portion of the switching devices as a result of the carrier signal and the reference signal of FIG. 8a;

FIG. 9b is a graphical representation of control signals supplied to a first portion of the switching devices as a result of the carrier signal and the reference signal of FIG. 9a;

FIG. 9c is a graphical representation of control signals supplied to a second portion of the switching devices as a result of the carrier signal and the reference signal of FIG. 9a;

FIG. 10b is a graphical representation of control signals supplied to a first portion of the switching devices as a result of the carrier signal and the reference signal of FIG. 10a;

FIG. 10c is a graphical representation of control signals supplied to a second portion of the switching devices as a result of the carrier signal and the reference signal of FIG. 10a;

Figure 1:
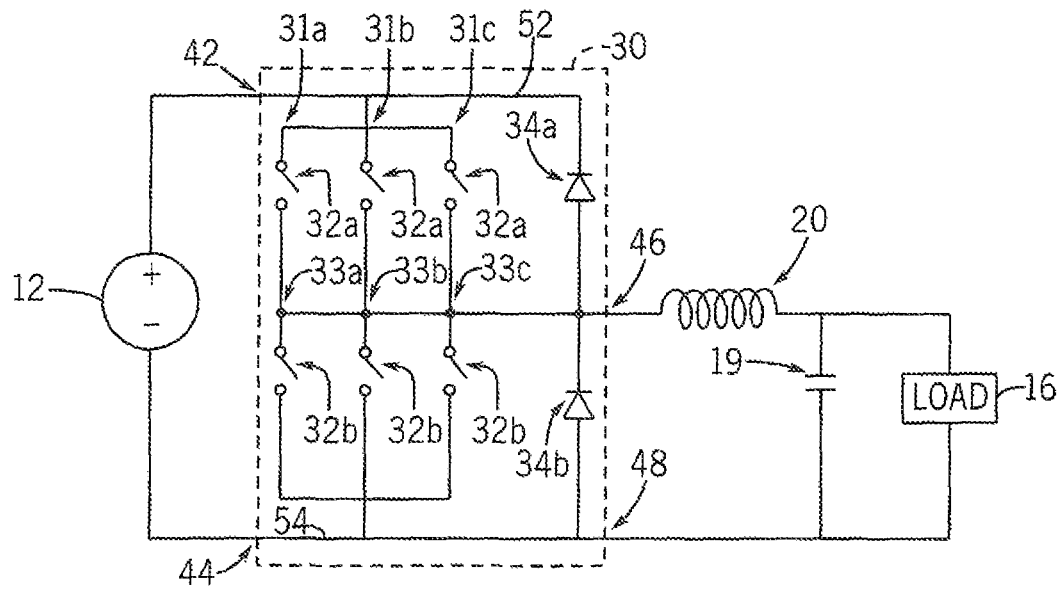
FIG. 1 is a simplified schematic representation of a switching power supply according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, a switching power supply 30 according to one embodiment of the invention is illustrated. The power supply 30 receives power from an input power source 12 at a first input terminal 42 and a second input terminal 44. According to the illustrated embodiment, the input power source 12 is a DC voltage source, supplying a DC voltage at a first voltage potential to the first and second input terminals 42, 44. The DC voltage present at the input is conducted within the switching power supply 30 via a positive rail 52 and a negative rail 54.

The terms positive and negative are used for reference herein and are not meant to be limiting. It is contemplated that the polarity of the DC voltage present at the input terminals 42, 44 may be negative, such that the potential on the negative rail 54 is greater than the potential on the positive rail 52. Each of the voltage rails 52, 54 are configured to conduct a DC voltage having a desired potential, according to application requirements. According to one embodiment of the invention, the positive rail 52 may have a DC voltage at a positive potential and the negative rail 54 may have a DC voltage at ground potential. Optionally, the positive rail 52 may have a DC voltage at ground potential and the negative rail 54 may have a DC voltage at a negative potential According to still another embodiment of the invention, the positive rail 52 may have a first DC voltage at a positive potential with respect to the ground potential and the negative rail 54 may have a second DC voltage at a negative potential with respect to the ground potential. The resulting DC voltage potential between the two rails 52, 54 is the difference between the potential present on the positive rail 52 and the negative rail 54.

The switching power supply 30 includes multiple legs 31, where each leg 31 is connected in parallel between the positive rail 52 and the negative rail 54. According to the illustrated embodiment, three legs 31a, 31b, and 31c are shown. Each leg 31 includes a first switching device 32a and a second switching device 32b connected in series between the positive rail 52 and the negative rail 54 with a common connection 33 between the first and second switching devices 32a, 32b. The first switching device 32a in each leg 31 may also be referred to herein as an upper switch, and the second switching device 32b in each leg 31 may also be referred to herein as a lower switch. The terms upper and lower are relational only with respect to the schematic representation and are not intended to denote any particular physical relationship between the first and second switching devices 32a, 32b. The switching devices 32 include, for example, power semiconductor devices such as transistors, thyristors, and silicon controlled rectifiers, which receive control signals to turn on and/or off. Each of the first and second switching devices 32a, 32b includes a diode 34a, 34b connected in parallel between the common connection 33 and either the positive or negative rail 52, 54. As illustrated in FIG. 1, one first diode 34a may be provided in parallel with all of the first switching devices 32a and one second diode 34b may be provided in parallel with all of the second switching devices 32b. Optionally and as shown in FIG. 2, separate diodes may be provided for each switching device.

The switching power supply 30 provides a desired output voltage potential for a load 16 across a first output terminal 46 and a second output terminal 48. An inductor 20 is connected between the first output terminal 46 and the load 16 to help maintain a constant current output from the power supply 30. An output capacitor 19 is also connected across the load 16. The output capacitor helps maintain a constant voltage for the load 16. Optionally, the inductor 20 and output capacitor 19 may be included within the switching power supply 30 and the load 16 may be connected directly across the first output terminal 46 and the second output terminal 48.

Figure 2:
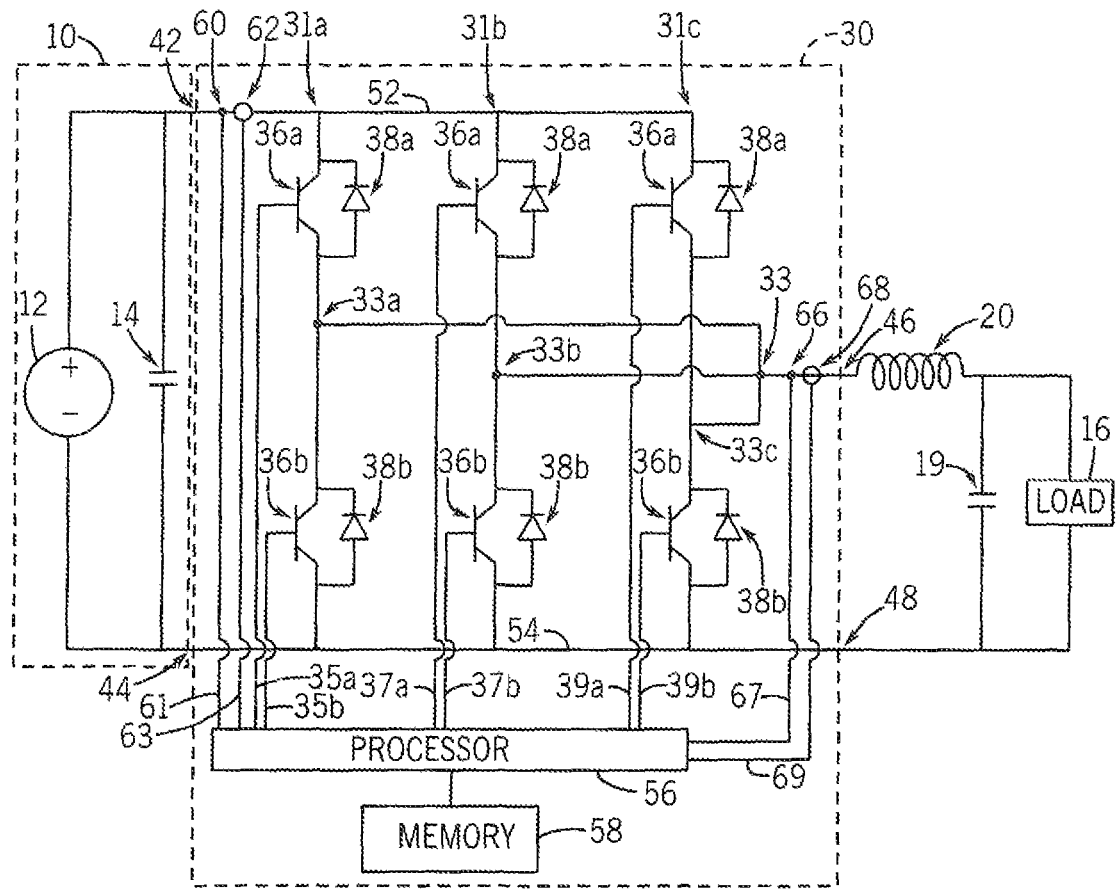
FIG. 2 is an expanded schematic representation of the switching power supply of FIG. 1.

Turning next to FIG. 2, additional details of the switching power supply 30 from FIG. 1 are illustrated. According to the illustrated embodiment, a power supply 10 includes the input power source 12 and a capacitor 14 connected between the positive and negative terminals of the input power source 12. The input power source 12 charges the capacitor 14 to a voltage potential substantially equal to voltage potential provided by the input power source 12, and the capacitor 14 reduces the magnitude of ripple present at the input of the power converter resulting from the power switching devices. It is understood that the capacitor 14 may be a single capacitor or multiple capacitors connected in parallel, in series, or a combination thereof. Optionally, the capacitor 14 may be included in part, or in whole, within the switching power supply 30 between the positive rail 52 and the negative rail 54. Each switching device 32a, 32b is illustrated as a transistor 36a, 36b and with a freewheeling diode 38a. 38b connected across the transistor 36a, 36b.

The switching power supply 30 may also include a processor 56 and a memory device 58. It is contemplated that the processor 56 and memory device 58 may each be a single electronic device or formed from multiple devices. Optionally, the processor 56 and/or the memory device 58 may be integrated on a field programmable array (FPGA) or an application specific integrated circuit (ASIC). The memory device 58 may include volatile memory, non-volatile memory, or a combination thereof. The processor 56 receives feedback signals from sensors providing an indication of the current operating conditions within the switching power supply 30. According to the illustrated embodiment, the switching power supply 30 includes a voltage sensor 60 and a current sensor 62 at the input of the switching power supply 30. The voltage sensor 60 generates a voltage feedback signal 61 and the current sensor 62 generates a current feedback signal 63, where each feedback signal 61, 63 corresponds to the operating conditions on the positive rail 52. The switching power supply 30 also includes a voltage sensor 66 and a current sensor 68 at the output of the switching power supply 30. The voltage sensor 66 generates a voltage feedback signal 67 and the current sensor 68 generates a current feedback signal 69, where each feedback signal 67, 69 corresponds to the operating conditions at the first output terminal 46. The processor 56 executes a program stored on the memory device 58 to generate control signals 35, 37, 39 which selectively enable/disable each of the switching devices 36. According to the illustrated embodiment, a first set of control signals 35 is provided to switching devices 36 in the first leg 31a, a second set of control signals 37 is provided to switching devices 36 in the second leg 31b, and a third set of control signals 39 is provided to switching devices 36 in the third leg 31c. It is noted that a first control signal 35a, 37a, 39a is provided to each of the upper switching devices 36a in the respective legs 31a, 31b, 31c, and a second control signal 35b, 37b, 39b is provided to each of the lower switching devices 36b in the respective legs 31a, 31b, 31c.

Figure 3:
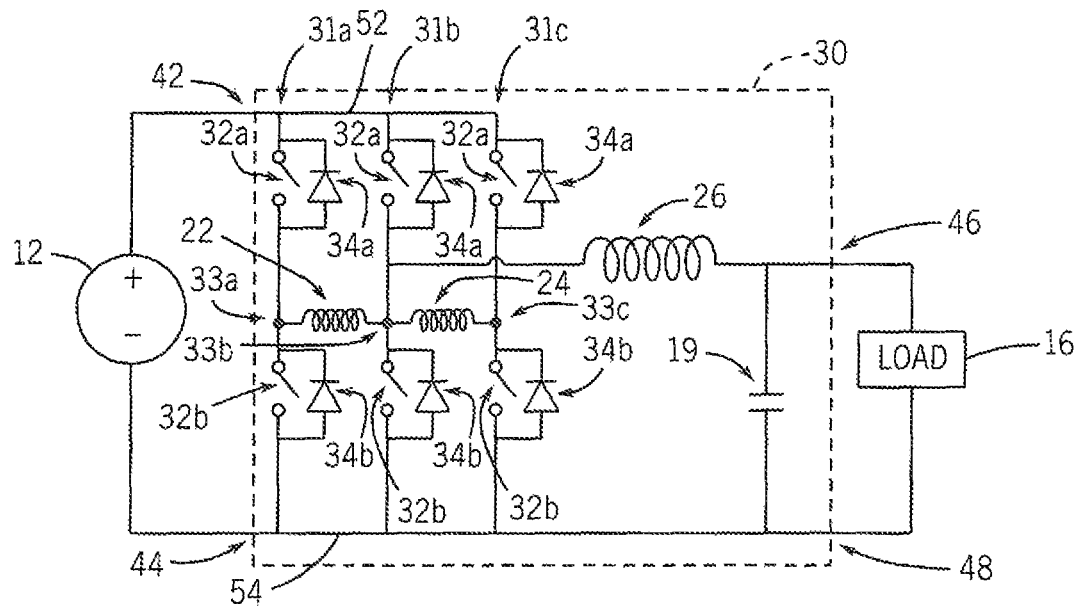
FIG. 3 is a simplified schematic representation of a switching power supply according to another embodiment of the invention.
Figure 4:
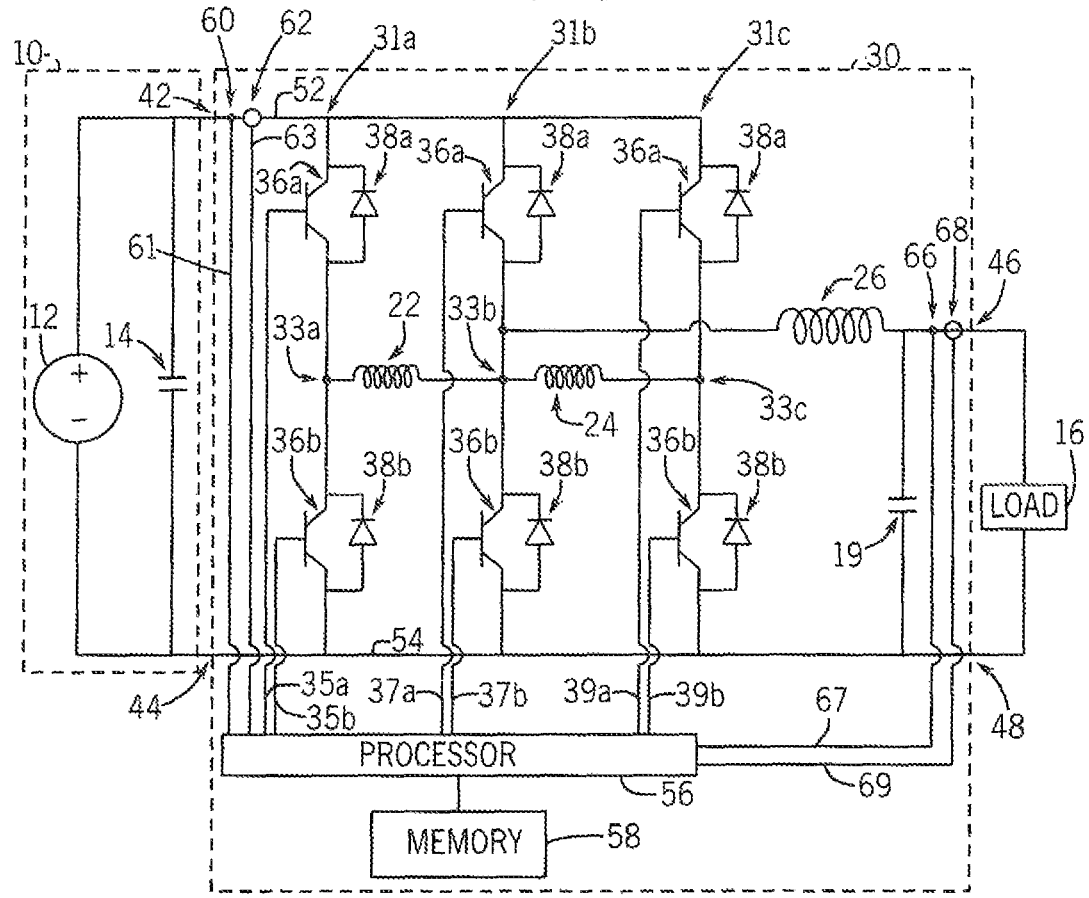
FIG. 4 is an expanded schematic representation of the switching power supply of FIG. 3.

Turning next to FIGS. 3 and 4, a switching power supply 30 according to another embodiment of the invention is illustrated. The switching power supply 30 again converts a DC voltage, supplied at a first voltage potential to the first and second input terminals 42, 44, to a second DC voltage potential, supplied at the output terminals 46, 48. The switching power supply 30 includes multiple legs 31, where each leg 31 is connected in parallel between the positive rail 52 and the negative rail 54. According to the illustrated embodiment, three legs 31a, 31b, and 31c are shown. Each leg 31 includes a first switching device 32a and a second switching device 32b connected in series between the positive rail 52 and the negative rail 54 with a common connection 33 between the first and second switching devices 32a, 32b. The switching devices 32a, 32b include, for example, power semiconductor devices such as transistors, thyristors, and silicon controlled rectifiers, which receive control signals to turn on and/or off. Each of the first and second switching devices 32a, 32b includes a diode 34a, 34b connected in parallel between the common connection 33 and either the positive or negative rail 52, 54.

In contrast to the first embodiment, illustrated in FIGS. 1 and 2, which utilizes a single inductor 20 connected at the output of the switching power supply 30, the embodiment illustrated in FIGS. 3 and 4 include a first inductor 22 and a second inductor 24 connected between pairs of the common connections 33. The first inductor 22 is connected between the common connection 33a of the first leg 31a and the common connection 33b of the second leg 31b. A second inductor 24 is connected between the common connection 33b of the second leg 31b and the common connection 33c of third leg 31c. A third inductor 26 is connected between the common connection 33b of the second leg 31b and the first output terminal 46. An output capacitor 19 is connected after the third inductor 26 and across the output terminals 46, 48. The load 16 is connected to and receives the second DC voltage potential, supplied at the output terminals 46, 48. Adding the first and second inductors 22, 24 provides isolation between legs 31 such that the diode 38 for each switching device 36 primarily receives the switching transient generated when the corresponding switching device 36 operates rather than each of the upper 38a or lower 38b diodes receiving at least a portion of the switching transient for each of the upper 36a or lower 36b switching devices.

Figure 5:
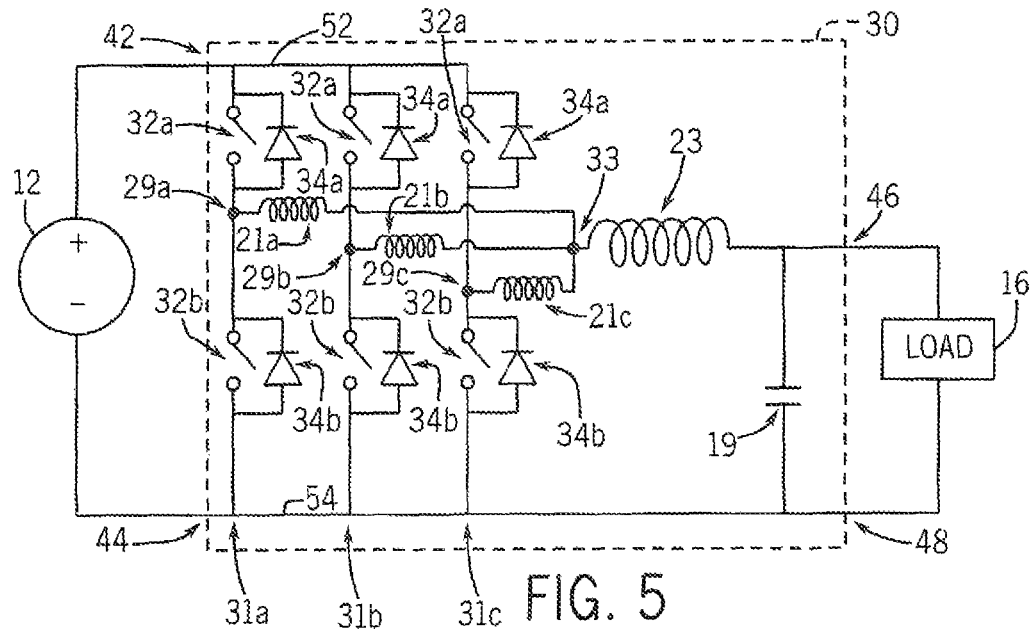
FIG. 5 is a simplified schematic representation of a switching power supply according to another embodiment of the invention.
Figure 6:
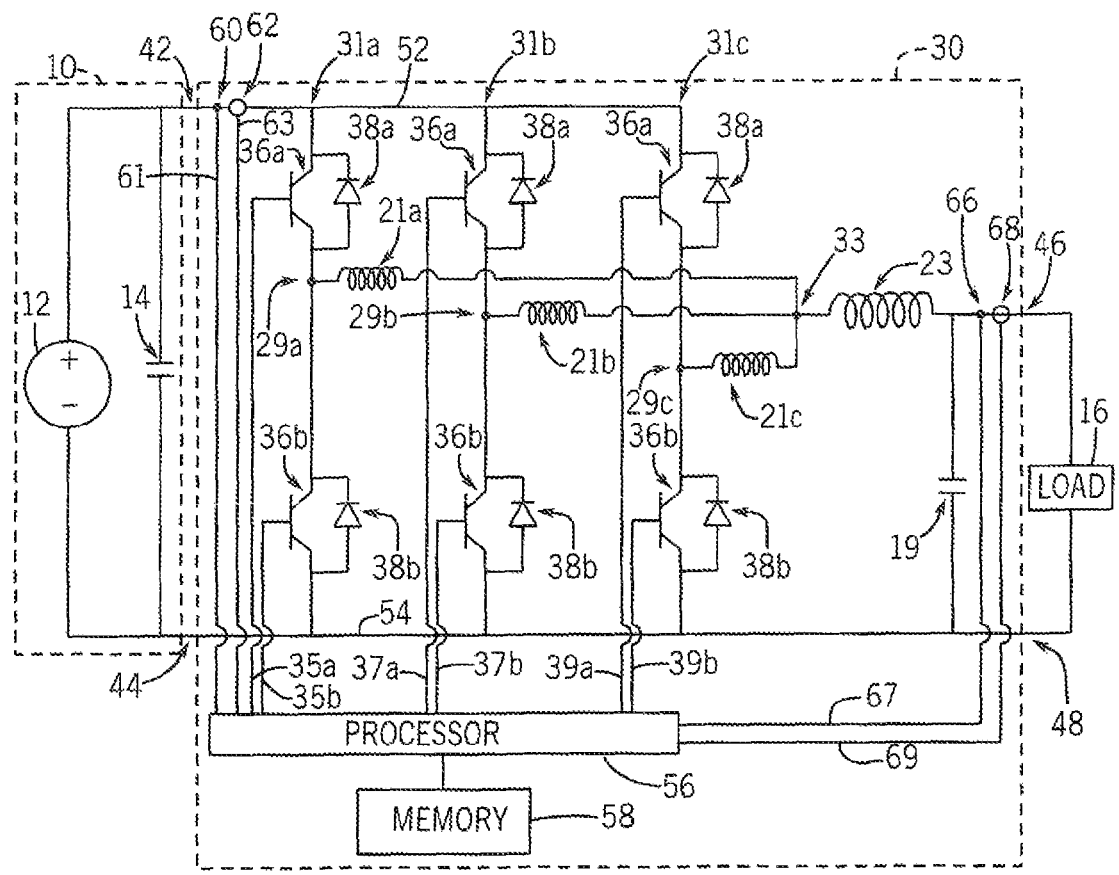
FIG. 6 is an expanded schematic representation of the switching power supply of FIG. 5.

Turning next to FIGS. 5 and 6, a switching power supply 30 according to yet another embodiment of the invention is illustrated. The switching power supply 30 again converts a DC voltage, supplied at a first voltage potential to the first and second input terminals 42, 44, to a second DC voltage potential, supplied at the output terminals 46, 48. The switching power supply 30 includes multiple legs 31, where each leg 31 is connected in parallel between the positive rail 52 and the negative rail 54. According to the illustrated embodiment, three legs 31a, 31b, and 31c are shown. Each leg 31 includes a first switching device 32a and a second switching device 32b connected in series between the positive rail 52 and the negative rail 54 with a middle connection 29 between the first and second switching devices 32a, 32b. Each leg 31 includes a middle connection 29 isolated from the other middle connections 29 of the other legs 31. The switching devices 32a, 32b include, for example, power semiconductor devices such as transistors, thyristors, and silicon controlled rectifiers, which receive control signals to turn on and/or off. Each of the first and second switching devices 32a, 32b includes a diode 34a, 34b connected in parallel between the middle connection 29 and either the positive or negative rail 52, 54.

In contrast to the first embodiment, illustrated in FIGS. 1 and 2, which utilizes a single inductor 20 connected at the output of the switching power supply 30, the embodiment illustrated in FIGS. 5 and 6 include a first set of inductors 21 connected between the middle connection 29 of each leg and a common connection 33. A first inductor 21a, selected from the first set of inductors 21, is connected between the middle connection 29a of the first leg 31a and the common connection 33. A second inductor 21b, selected from the first set of inductors 21, is connected between the middle connection 29b of the second leg 31b and the common connection 33. A third inductor 21c, selected from the first set of inductors 21, is connected between the middle connection 29c of the third leg 31c and the common connection 33. It is contemplated that each of the inductors 29a. 29b, and 29c in the first set of inductors 21 is the same value to obtain a balanced set of inductors between each middle connection 29 and the common connection 33. An output inductor 23 is then connected between the common connection 33 and the first output terminal 46. An output capacitor 19 is connected after the output inductor 23 and across the output terminals 46, 48. The load 16 is connected to and receives the second DC voltage potential, supplied at the output terminals 46, 48. Adding the first set of inductors 21 provides another embodiment having isolation between legs 31 such that the diode 38 for each switching device 36 primarily receives the switching transient generated when the corresponding switching device 36 operates rather than each of the upper 38a or lower 38b diodes receiving at least a portion of the switching transient for each of the upper 36a or lower 36b switching devices.

In operation, the processor 56 in the switching power supply 30 generates control signals 35, 37, 39 to provide desired operation of the power switching devices 36. With reference next to FIG. 7, an exemplary modulation technique for generating the control signals 35, 37, 39 is illustrated. The switching power supply 30 is configured to provide a desired voltage potential for the load 16 at the output terminals 46, 48. The desired voltage potential is known and may be a fixed value or a configurable value. The value of the desired voltage potential is stored in the memory device 58 and may be read by the processor 56. Based on one or more feedback signals 61, 63, 67, 69 from voltage sensors 60, 66 and/or current sensors 62, 68, the processor 56 determines a desired duty cycle at which the switching devices 36 need to operate to generate the desired voltage potential at the output terminals 46, 48.

According to the illustrated embodiment, the processor 56 generates the control signals 35, 37, 39 using a sawtooth comparison modulation technique. Although the invention will be discussed with respect to the illustrated modulation technique, it is understood that various other modulation techniques may be implemented without deviating from the scope of the invention. The processor 56 utilizes the desired voltage potential, as previously determined, to generate a reference signal 100. The processor 56 also generates a carrier signal 102, which is the sawtooth waveform in the illustrated embodiment. The reference signal 100 is compared to the carrier signal 102 to generate the desired control signals 35, 37, 39. It is contemplated that the processor 56 may execute one or more stored programs to generate the reference signal 100 and the carrier signal 102 and to execute the comparator functions digitally. Optionally, the processor 56 may output the reference signal 100 and carrier signal 102 to an external circuit, such as an operational amplifier configured to perform the comparison. It is contemplated that still other configurations of digital and/or analog logic circuits may be utilized without deviating from the scope of the invention.

Figure 7A:
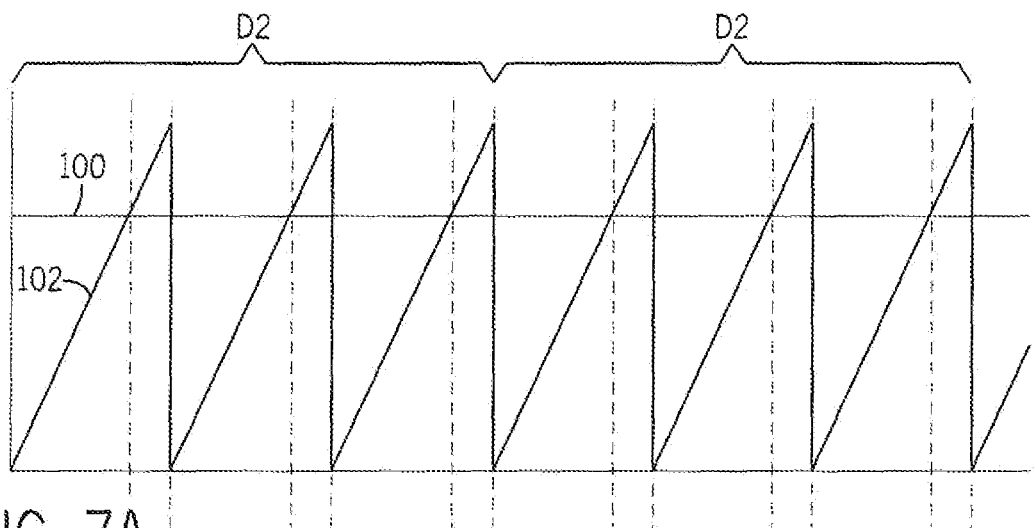
FIG. 7a is a graphical representation of a carrier signal and a reference signal used to generate control signals for switching devices in a switching power supply according to one embodiment of the invention.
Figure 7B:
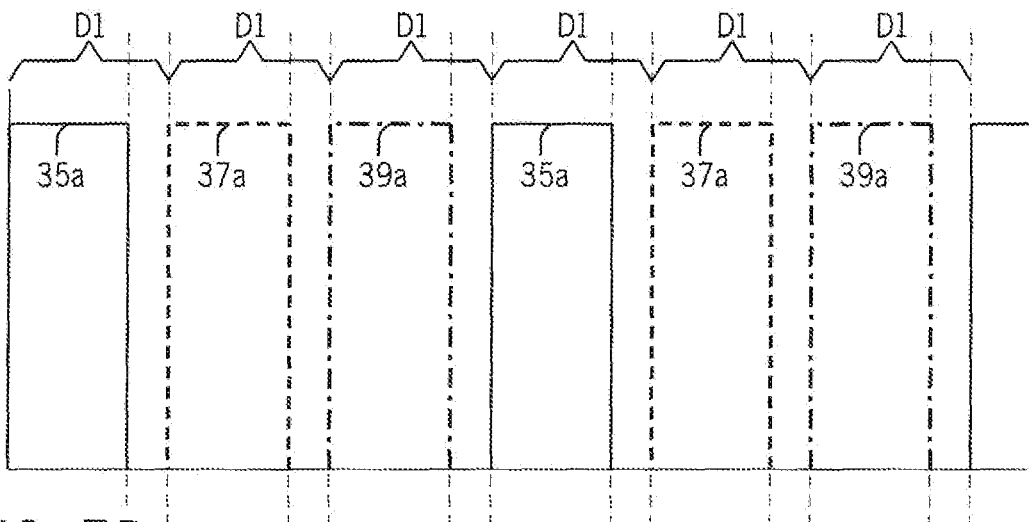
Figure 7C:
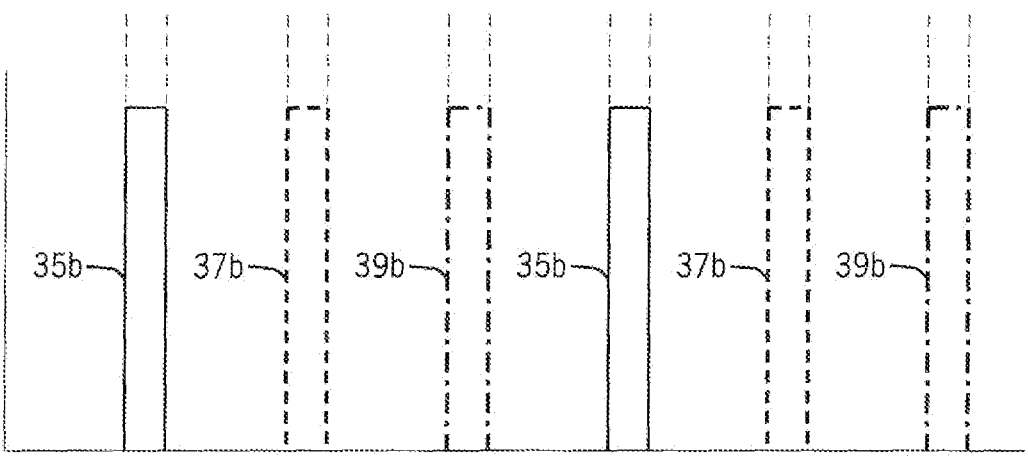

The carrier signal 102 is generated at a carrier frequency and has a carrier period, D1, which is inverse to the carrier frequency. The carrier signal 102 is a periodic waveform, where one cycle of the waveform is generated within each carrier period, D1. For the illustrated sawtooth carrier signal 102, the carrier signal starts the carrier period, D1, at zero and ramps up to a maximum voltage at the end of the carrier period. The reference signal 100 has a magnitude between the minimum and maximum values of the carrier signal 102. Comparison of the reference signal 100 to the carrier signal 102 results in generation of the control signals 35, 37, 39. With reference also to FIGS. 7b and 7c, when the magnitude of the reference signal 100 is greater than the magnitude of the carrier signal 102, a control signal 35a, 37a, 39a for one of the upper switches 36a is generated. When the magnitude of the reference signal 100 is less than the magnitude of the carrier signal 102, a control signal 35b, 37b, 39b for one of the lower switches 36b is generated.

In order to reduce switching losses within the switching power supply 30, the processor 56 generates a control signal 35, 37, 39 for just one leg 31 of the switching power supply 30 during each carrier period, D1. With reference to FIGS. 7a-7c, the processor 56 rotates between the legs 31 during successive carrier periods, D1, and within a second period, D2, at a second frequency. Within each second period, D2, each leg 31 receives one set of control signals. According to the illustrated embodiment, the first leg 31a receives the first set of control signals 35. When the reference signal 100 is greater than the carrier signal 102, the control signal 35a for the upper switch 36a in the first leg 31a is active. When the reference signal 100 is less than the carrier signal 102, the control signal 35b for the lower switch 36b in the first leg 31a is active. The second leg 31b receives the second set of control signals 37. When the reference signal 100 is greater than the carrier signal 102, the control signal 37a for the upper switch 36a in the second leg 31b is active. When the reference signal 100 is less than the carrier signal 102, the control signal 37b for the lower switch 36b in the second leg 31b is active. The third leg 31c receives the third set of control signals 39. When the reference signal 100 is greater than the carrier signal 102, the control signal 39a for the upper switch 36a in the third leg 31c is active. When the reference signal 100 is less than the carrier signal 102, the control signal 39b for the lower switch 36b in the third leg 31c is active.

As a result of supplying control signals to one leg 31 at a time and of rotating between legs, each switching device 36 switches at a second frequency which is a fraction of the carrier frequency. The second frequency is equal to the carrier frequency divided by the number of legs 31 present in the switching power supply 30. According to the illustrated embodiment, which has three legs 31, the second frequency is one-third of the carrier frequency.

Although each switching device 36 needs to be rated to handle the full capacity of power transferred between the input and the output, the cost and size of switching devices is dependent both on the power rating and on the rated switching frequency. Each time the device is turned on or off (i.e. switched) the sudden transient results in power loss on the device. If the frequency of switching is increased, the frequency at which power is dissipated within the device increases resulting in an increase in power dissipated within the device. The increase in power dissipated requires increased cooling capacity, such as a larger heat sink, more surface area, or additional cooling features such as fan-cooling or liquid-cooling. Thus, reducing the switching frequency of the device reduces the size and cost of the device required for comparable power capacity.

However, because each leg 31 is connected at the common connection 33, the frequency of the switched voltage observed at the output of the switched power supply 30 remains equal to the carrier frequency. In contrast to switching devices, the cost and size of inductors required to minimize harmonic content is reduced as the switching frequency increases. When the switching frequency increases, the time during which the magnitude of voltage or current can change decreases. Thus, increasing switching frequency results in a lower magnitude of ripple on an inductor for comparable power capacity. As a result of the lower magnitude of ripple, the size and/or the power capacity of the inductor 26 provided at the output of the switched power supply 30 is reduced.

Figure 8A:
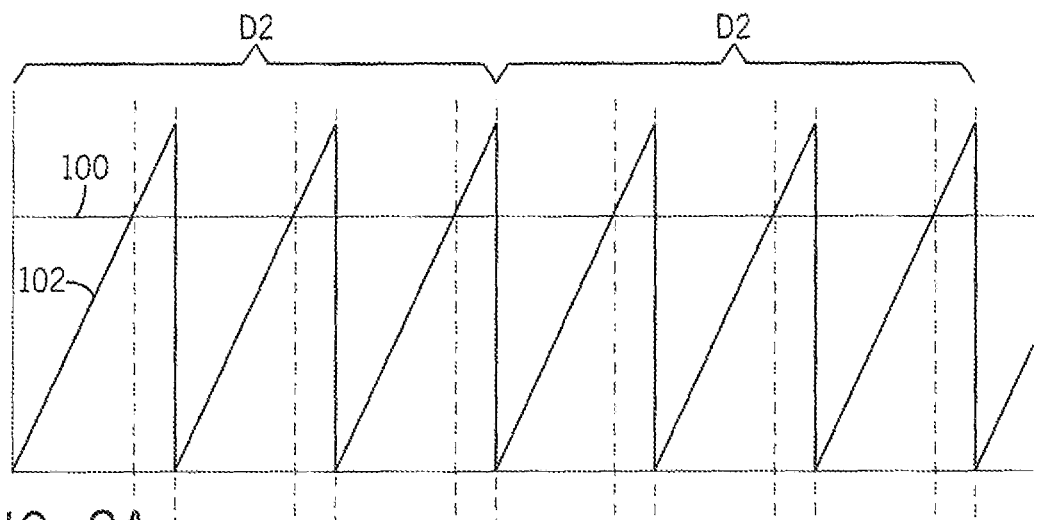
FIG. 8a is a graphical representation of a carrier signal and a reference signal used to generate control signals for switching devices in a switching power supply according to another embodiment of the invention.
Figure 8B:
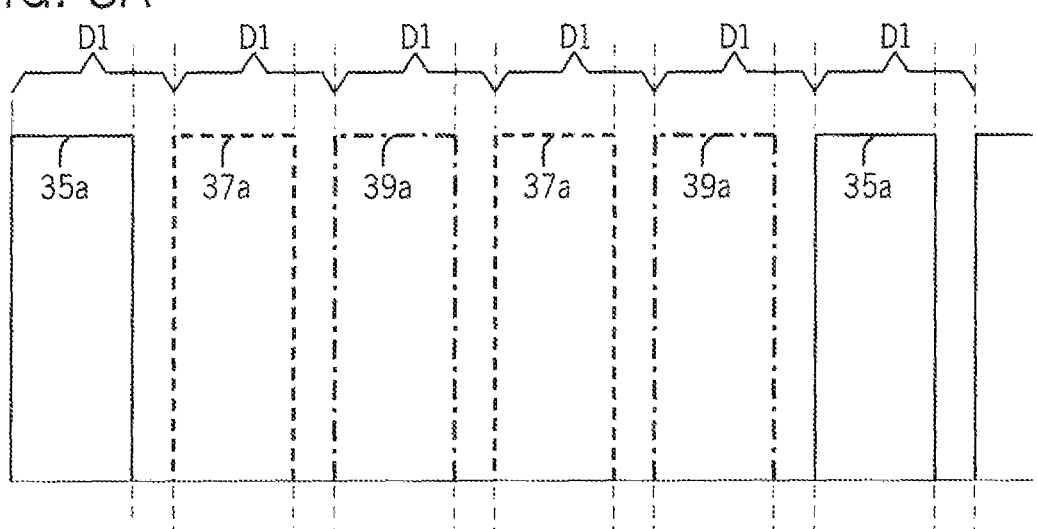
Figure 8C:
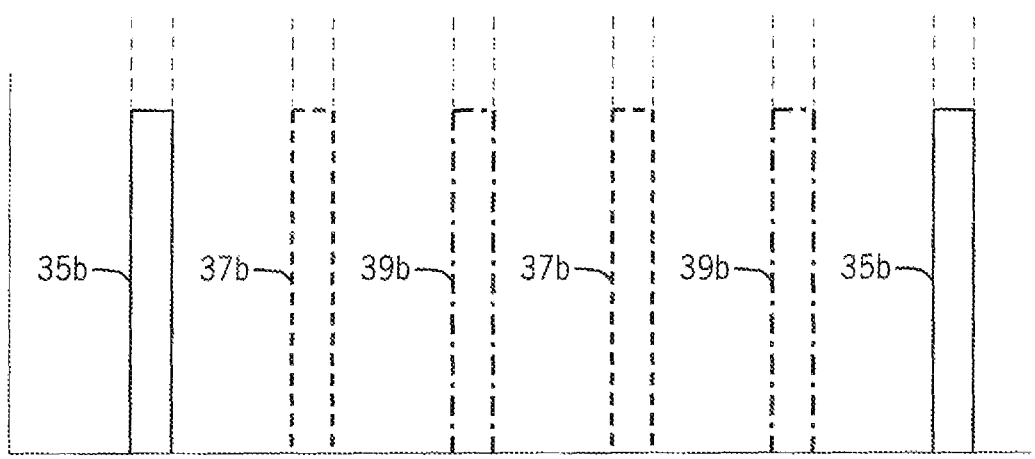

With reference next to FIG. 8, it is contemplated that the order in which each leg 31 is switched may be varied. In contrast to FIG. 7, in which each leg 31a, 31b, 31c receives the respective control signals 35, 37, 39 in the same order during each period, D2, of the second frequency, FIG. 8 illustrates a rotation of the legs 31 receiving their control signals 35, 37, 39. During a first instance of the second period, D2, the legs 31 are switched in order from the first leg 31a, to the second leg 31b, and to the third leg 31c, generating control signals 35, 37, and 39 as discussed above with respect to FIG. 7. During a second instance of the second period, D2, the legs 31 are switched beginning with the second leg 31b, moving to the third leg 31c, and then to the first leg 31a, generating the respective control signals 37, 39, and 35 in a different order. The order may continue to be varied in an ordered manner, for example, by starting with the third leg 31c in the third instance of the second period, D2, and repeating the rotating sequence. Optionally, the order may be varied in a random or pseudo-random manner as long as each leg 31 receives control signals 35, 37, 39 once during each of the second periods, D2. Varying the order in which the legs 31 are switched may be desirable to spread harmonic content resulting from modulation of the switching devices 36 over a broader spectrum of frequencies.

Figure 9A:
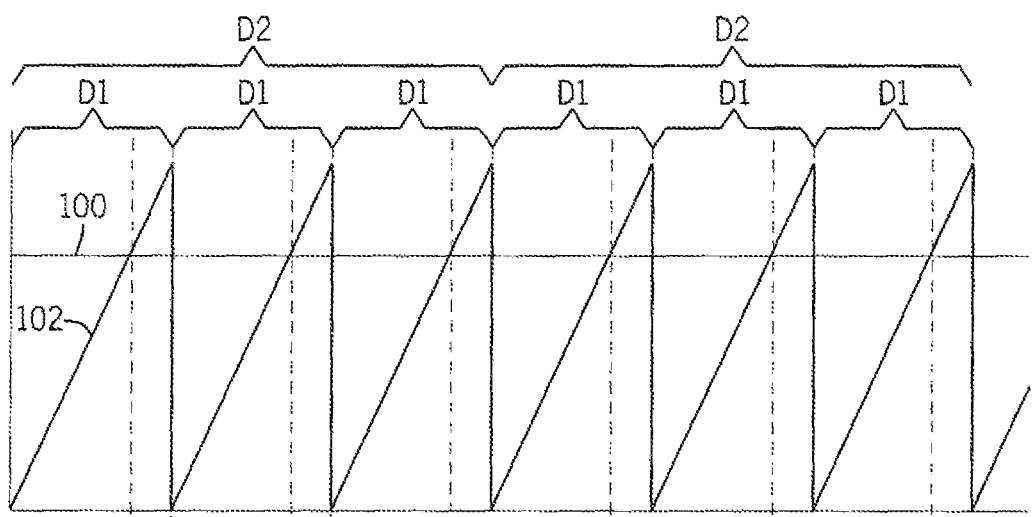
FIG. 9a is a graphical representation of a carrier signal and a reference signal used to generate control signals for switching devices in a switching power supply according to another embodiment of the invention.
Figure 9B:
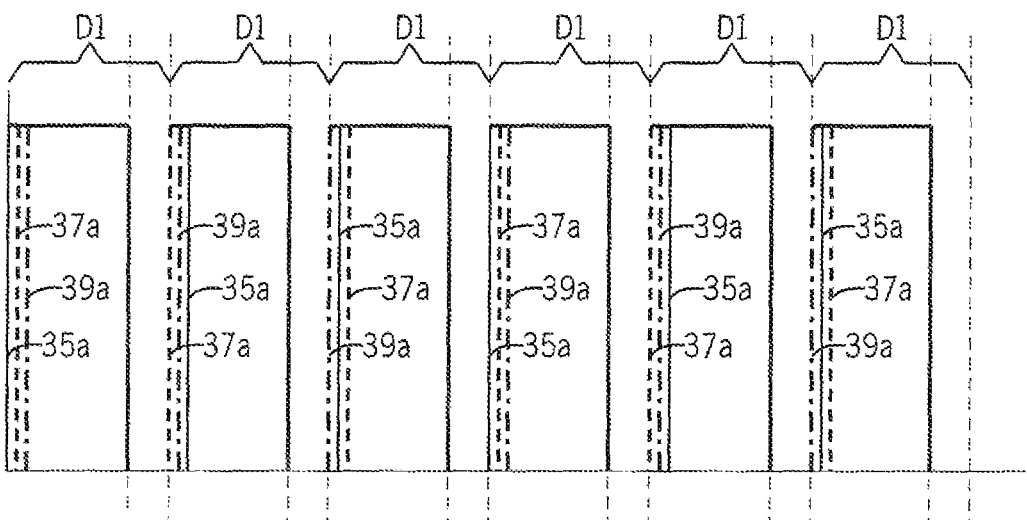
Figure 9C:
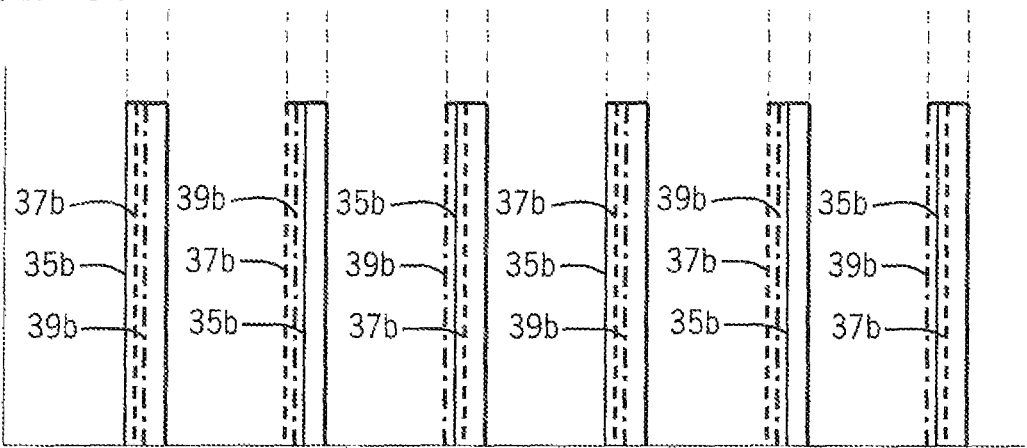

It is contemplated that each leg 31 may be switched at the carrier frequency yet still provide reduced switching losses. It has been determined that the transient voltage and/or current spike resulting from turning one of the switching devices 36 on, occurs primarily in a first switching device 36 that is switched on when multiple switching devices 36 are connected in parallel. That is, for either the upper switching devices 36a or lower switching devices 36b where, according to the illustrated embodiment, three switching devices are connected in parallel, if one of the switching devices is turned on, as long as the first device remains on, switching each of the other two devices on does not result in a significant transient voltage and/or current spike. With reference to FIG. 9, during a first carrier period, D1, the control signal 35a for the upper switching device 36a in the first leg 31a is turned on first when the reference signal 100 is greater than the carrier signal 102. Similarly, the control signal 35b for the lower switching device 36b in the first leg 31a is turned on first when the reference signal 100 is less than the carrier signal 102. Within the same carrier period and after the control signal 35 for the first leg 31a has been generated, the processor 56 may generate control signals 37, 39 for the second and third legs 31b, 31c, respectively. The delay between generating the first control signal 35 and the second and third control signals 37, 39 is preferably long enough to allow the initial transient voltage and/or current spike to dissipate prior to enabling the additional switching devices 36. This delay may vary between applications and may be selected, for example, according to the turn-on time for the switching device.

Just as the individual legs 31 receiving control signals are rotated within a second duration, D2, in the exemplary embodiment discussed with respect to FIG. 8, the leg 31 corresponding to the switching device 36 which is the initial switching device enabled is rotated within the second duration, D2, as illustrated in FIG. 9. In a first carrier period, D1, the switching devices 36 in the first leg 31a are each enabled first, as shown by the first control signals 35a, 35b being generated first. In a second carrier period, D1, the switching devices 36 in the second leg 31b are each enabled first, as shown by the second control signals 37a, 37b being generated first. Finally, in a third carrier period, D1, the switching devices 36 in the third leg 31c are each enabled first, as shown by the third control signals 39a, 39b being generated first. Although each switching device 36 is switched at a higher carrier frequency, each switching device 36 experiences substantially the switching losses associated with the second frequency, D2. Further, each switching device experiences a reduced conduction loss. As subsequent devices are enabled, the current through either the upper switching devices 36a or lower switching devices 36b is conducted through parallel paths, thereby reducing the overall current through each path. With the reduced current, the power dissipated in each device due to conduction is reduced as well.

In FIG. 9, the second and third control signals within each carrier period are illustrated as being generated in a sequential manner. However, this is for ease of illustration and it is contemplated that both the second and third control signals within each carrier period may be generated in tandem but after the first control signal has been generated and after a sufficient delay, such as the turn-on time for the first switching device 36 has elapsed. It is also contemplated that elements of each of the illustrated embodiments may be used in combination with other embodiments. For example, the variable order in which the control signals 35, 37, 39 are generated in the embodiment illustrated in FIG. 8 may be incorporated with the embodiment in FIG. 9, to vary the order in which the first control signal to be generated in each carrier period is selected.

Figure 10A:
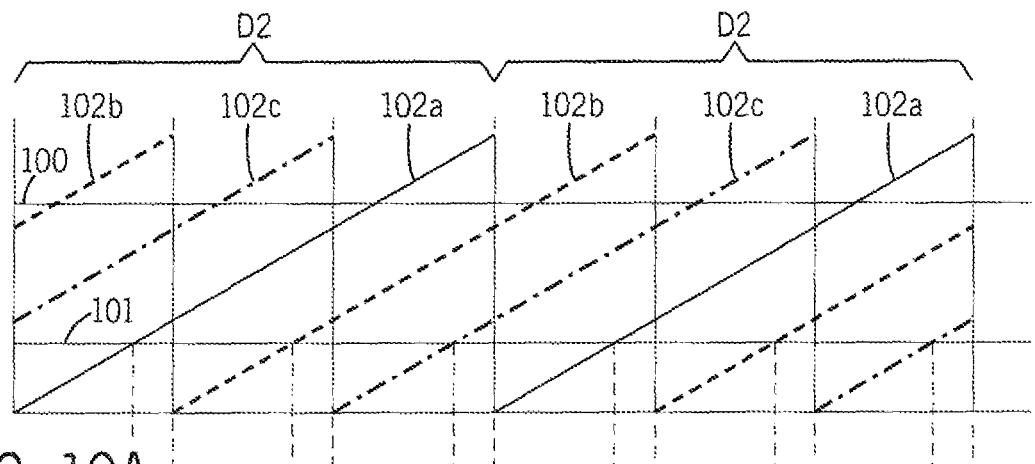
FIG. 10a is a graphical representation of a carrier signal and a reference signal used to generate control signals for switching devices in a switching power supply according to another embodiment of the invention.
Figure 10B:
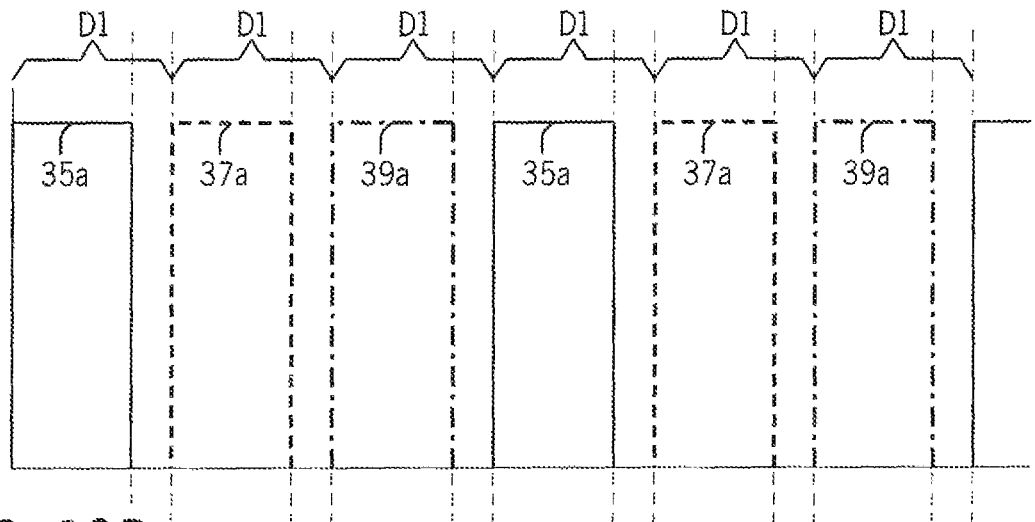
Figure 10C:
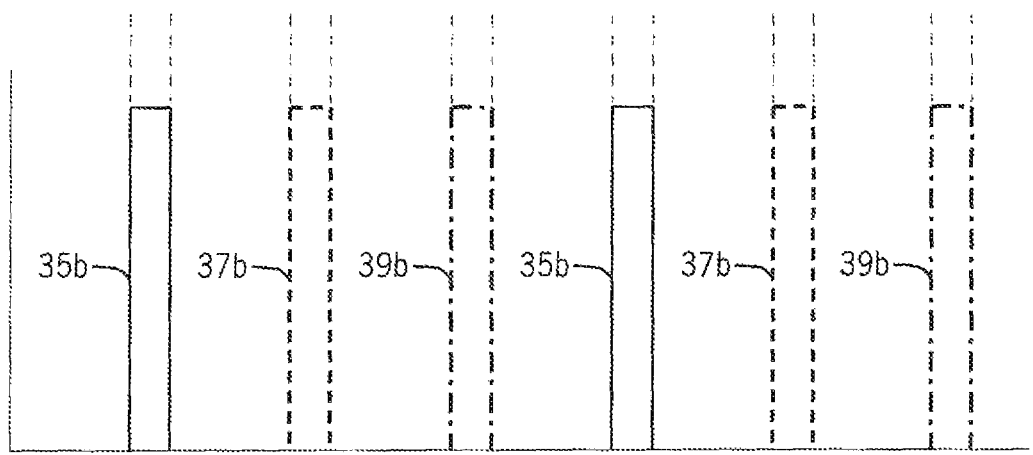

With reference next to FIG. 10, the carrier frequency is generated at the slower frequency (i.e, the carrier period is equal to the second period, D2) but the resultant output frequency remains greater than the switching frequency. One carrier signal is generated such that the carrier period is equal to the second period, D2. The carrier signal is, however, phase shifted for each leg 31. Each of the phase-shifted carrier signals are used to generate control signals for the respective leg 31. According to the embodiment illustrated in FIG. 10, the power supply 30 has three legs 31. A first carrier signal 102a has no phase shift. A second carrier signal 102b is shifted by one hundred twenty degrees, and a third carrier signal 102c is shifted by two hundred forty degrees. The amount of phase shift between successive carrier signals is equal to three hundred sixty degrees divided by the number of legs 31 present in the power supply 31.

Each carrier signal is then used to generate the control signals for the respective leg 31 of the power supply 30. The reference signal 100 may be determined, as discussed above, to determine a desired output voltage. The reference signal 100 is then divided by the number of legs 31 present to determine a second reference signal 101. The second reference signal 101 is compared against the corresponding carrier signal 102a-c for each leg 31a-31c such that a portion of the desired output power is supplied by each leg 31 during each carrier period, D2. Similar to the modulation methods discussed above, each leg 31 is, therefore, active within the period, D1, of the first frequency but is only active once within each period, D2, of the second frequency. Each leg 31 switches at a slower frequency while the resulting output frequency observed at the inductor 20 is a higher frequency.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A system for controlling power flow between an input to a power converter and an output from the power converter, wherein the input includes a first and a second terminal and the output includes a first and a second terminal, the system comprising:
   a plurality of legs within the power converter, each leg including:
      a common connection,
      a first switching device connected between the first terminal of the input and the common connection for that leg, and
      a second switching device connected between the common connection for that leg and the second terminal of the input, wherein the common connections for each leg are connected together and are connected to the first terminal of the output;
   an inductor connected in series between the first terminal of the output and a load operable to receive the power output from the power converter; and
   a processor operable to generate a carrier signal, having a carrier frequency, and to generate a plurality of control signals, wherein each control signal corresponds to the first switching device for one of the plurality of legs and selectively establishes an electrical connection between the first terminal of the input and the common connection for that leg, wherein a first duration is defined equal to the period of the carrier frequency and a second duration is defined equal to a number of the plurality of legs present in the power converter multiplied by the first duration, and wherein each of the plurality of control signals is provided to the corresponding first switching device once within the second duration.

2. The system of claim 1 wherein the processor is further operable to generate the control signal corresponding to one of the first switching devices within each period of the carrier frequency and to generate the control signal for each of the first switching devices according to a sequence within consecutive periods of a second frequency, wherein the second frequency is equal to the inverse of the second duration, such that one leg at a time is connected between the first terminal of the input and the first terminal of the output.

3. The system of claim 2 wherein the processor is further operable to change the sequence in which the control signal for each of the first switching devices is generated between consecutive periods of the second frequency.

4. The system of claim 1 wherein the processor is further operable to generate the control signal for the first switching device in a first leg, selected from the plurality of legs, at a first time within each period of the carrier frequency and to generate the control signal for the first switching device for each of the other legs, selected from the plurality of legs, at a time subsequent to the first time within each period of the carrier frequency.

5. The system of claim 1 wherein the inductor is contained within the power converter.

6. The system of claim 1 wherein the inductor connected in series between the first terminal of the output and the load is a first inductor, the system further comprising a plurality of second inductors, wherein each of the second inductors is connected between the common connection of one of the plurality of legs and the first terminal of the output.

7. A method for reducing losses in a power converter, wherein the power converter includes a first voltage rail configured to conduct a DC voltage at a first voltage potential, a second voltage rail configured to conduct a DC voltage at a second voltage potential, a plurality of legs wherein each leg is connected in parallel between the first voltage rail and the second voltage rail and wherein each leg includes at least one switching device, the method comprising the steps of:
- executing a modulation routine on a processor at a first frequency; and
- generating a plurality of control signals with the processor, wherein:
  - each control signal corresponds to the at least one switching device on one of the plurality of legs,
  - one control signal is generated during each period of a first frequency,
  - the control signal for the at least one switching device for each of the plurality of legs is generated in a sequence within a second frequency; and
  - the second frequency is equal to the first frequency divided by the number of legs.

8. The method of claim 7 wherein:
- the first frequency is a carrier frequency, defining a carrier period within which a carrier signal is repeated, and
- the second frequency is a switching frequency, defining a period within which the control signal for each of the plurality of legs is generated one time.

9. The method of claim 7 further comprising the step of:
- generating a plurality of carrier signals within the processor, wherein
  - a carrier frequency, defining a carrier period within which a carrier signal is repeated, is equal to the second frequency,
  - a switching frequency, defining a period within which the control signal for each of the plurality of legs is generated one time, is equal to the second frequency,
  - each of the plurality of carrier signals corresponds to one of the plurality of legs,
  - each of the plurality of carrier signals is repeated within the carrier period, and
  - each of the plurality of carrier signals is phase shifted from each other as a function of a number of legs present in the system.

10. The method of claim 9 further comprising the steps of:
- generating an initial reference signal corresponding to the a desired output voltage; and
- generating a second reference signal, wherein:
  - the second reference signal is equal to the initial reference signal divided by a number of legs present in the plurality of legs, and
  - the control signal for each leg is generated by comparing the second reference signal to the carrier signal for the corresponding leg.

11. The method of claim 7 further comprising the step of rotating an order in the sequence the control signals are generated between successive periods of the second frequency.

12. The method of claim 7 wherein:
- each control signal is generated during each period of the first frequency,
- a first control signal for the at least one switching device in a first leg, selected from the plurality of legs, is generated at a first time within each period of the first frequency, and
- the control signal for the at least one switching device for each of the other legs, selected from the plurality of legs, is generated at a time subsequent to the first time within each period of the first frequency.

13. A system for controlling power flow between an input to a power converter and an output from the power converter, wherein the input includes a first and a second terminal and the output includes a first and a second terminal, the system comprising:
- a first voltage rail within the power converter connected to the first terminal of the input;
- a second voltage rail within the power converter connected to the second terminal of the input;
- a plurality of legs within the power converter, wherein each leg is connected in parallel to the other legs between the first voltage rail and the second voltage rail and wherein each leg includes at least one switching device selectively enabled by a control signal;
- a processor operable to:
  - generate a carrier signal at a carrier frequency for a modulation routine;
  - generate the control signal for the at least one switching device in one of the plurality of legs during each carrier period,
  - generate the control signal for the at least one switching device for each of the plurality of legs in a sequence such that the at least one switching device for each of the plurality of legs receives its corresponding control signal once within a second frequency, wherein the second frequency is equal to the carrier frequency divided by the number of legs.

14. The system of claim 13 wherein the processor is further operable to rotate an order in the sequence between successive periods of the second frequency.

15. The system of claim 13 wherein the processor is further operable to generate the control signal for the at least one switching device in a first leg, selected from the plurality of legs, at a first time within each carrier period and to generate the control signal for the at least one switching device for each of the other legs, selected from the plurality of legs, at a time subsequent to the first time within each carrier period.

16. The system of claim 15 wherein a different leg from the plurality of legs is selected as the first leg in the sequence such that the at least one switching device for each of the plurality of legs receives its corresponding control signal first once within the second frequency.

17. The system of claim 16 wherein the processor is further operable to rotate an order in the sequence between successive periods of the second frequency.

18. The system of claim 13 wherein each of the plurality of legs within the power converter includes:
- a common connection, a first switching device connected between the first voltage rail and the common connection for that leg, and
a second switching device connected between the common connection for that leg and the second voltage rail, wherein:
the common connection for each of the plurality of legs is connected together and connected to the first terminal of the output, and the system further comprises an inductor connected in series between the common connection for each of the plurality of legs and a load connected to the first terminal of the output.

19. The system of claim 13 wherein each of the plurality of legs within the power converter includes:
a common connection,
a first switching device connected between the first voltage rail and the common connection for that leg, and
a second switching device connected between the common connection for that leg and the second voltage rail, wherein the system further includes:
a plurality of first inductors, each inductor connected between the common connections of a first and second leg selected from the plurality of legs, wherein each of the plurality of legs includes one of the first inductors connected to the common connection of the leg; and
a second inductor, wherein the second inductor is connected between the common connection of one of the plurality of legs and a load connected to the first terminal of the output.

20. The system of claim 13 wherein each of the plurality of legs within the power converter includes:
a middle connection,
a first switching device connected between the first voltage rail and the middle connection for that leg,
a second switching device connected between the middle connection for that leg and the second voltage rail, and
and an inductor connected between the middle connection and a common connection for the system; and wherein the system further includes:
an output inductor connected between the common connection for the system and a load receiving power from the output of the power converter.

* * * * *